May 18, 1965  R. G. CUDINI  3,183,784
BURRING MACHINE
Filed July 19, 1961  2 Sheets-Sheet 1
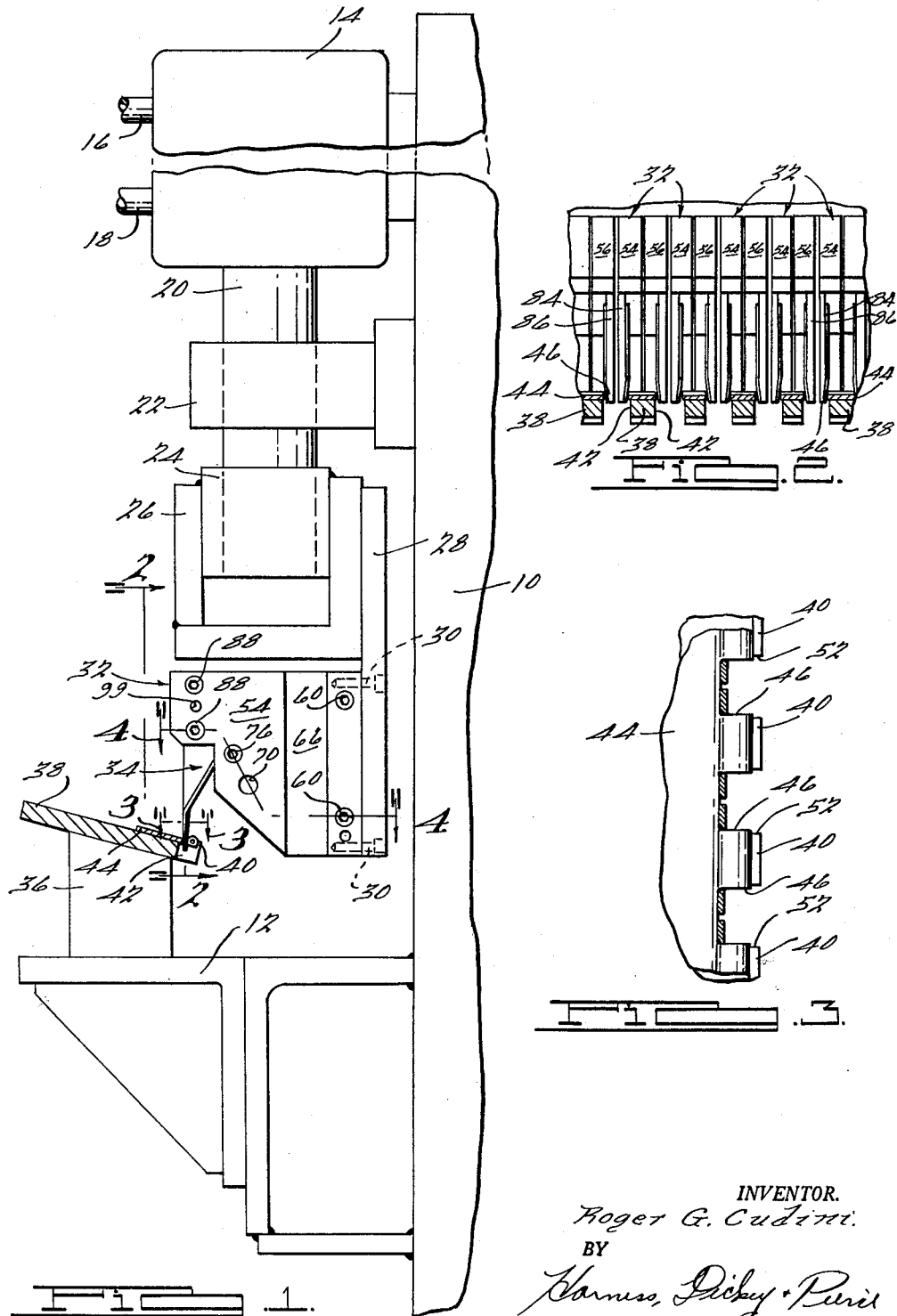
INVENTOR.
Roger G. Cudini
BY
Harness, Dickey & Pierce
ATTORNEYS

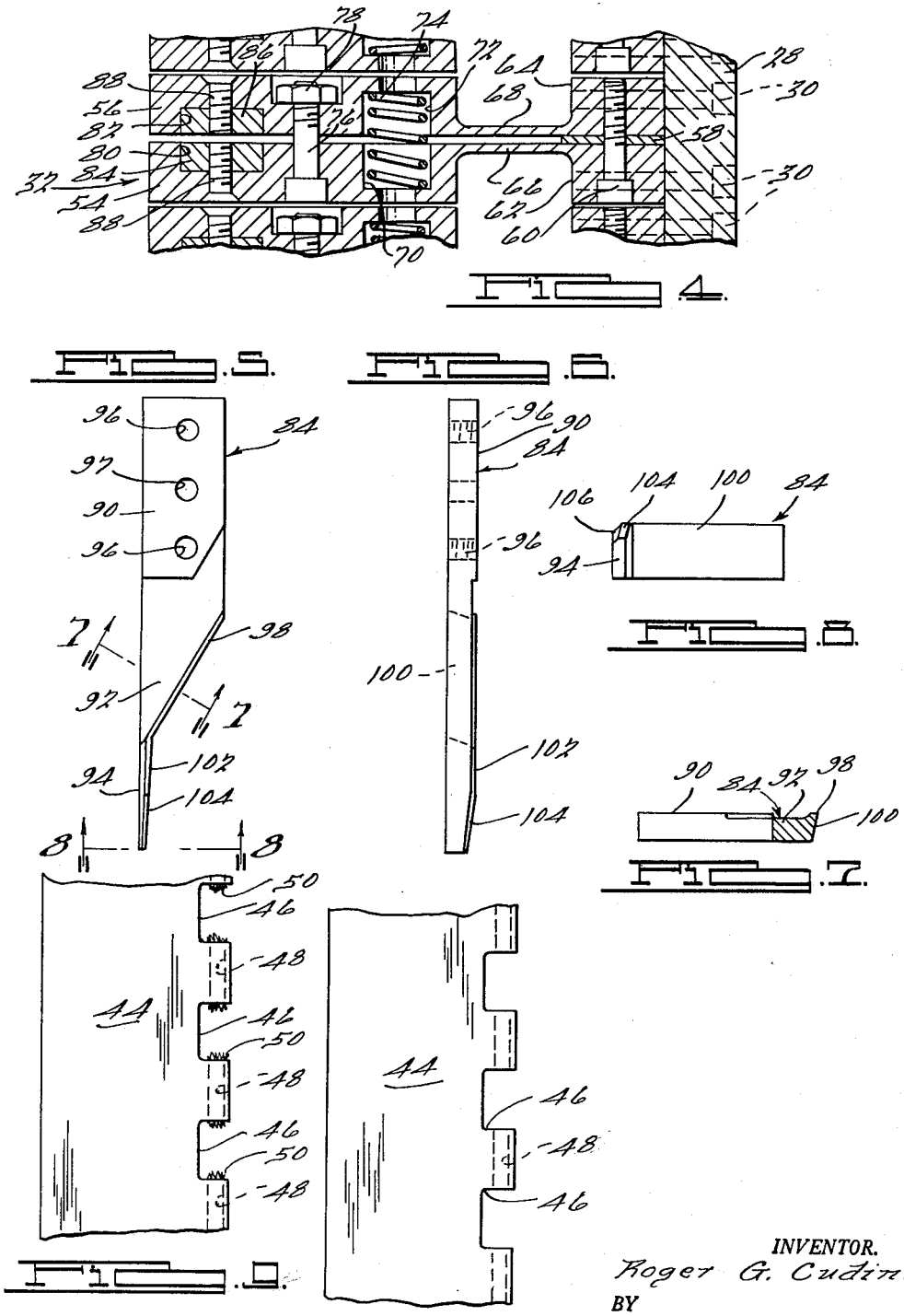

United States Patent Office 3,183,784
Patented May 18, 1965

3,183,784
BURRING MACHINE
Roger G. Cudini, Birmingham, Mich., assignor to Moynahan Bronze Company, Flat Rock, Mich., a corporation of Michigan
Filed July 19, 1961, Ser. No. 125,193
5 Claims. (Cl. 90—90)

The present invention relates to burring machines, and more particularly to machines for removing burrs from elongated slotted articles, such as elongated hinge members.

It is a primary object of the present invention to provide a novel burring machine of the type described which is relatively simple in design, efficient and quick acting in operation, and flexible in the type of application to which it may be adapted, for accurately removing burrs formed in the manufacture of elongated hinge parts.

A further object of the invention resides in the provision of a reciprocatable broaching tool of unique construction for removing burrs from the side of a slot, which broaching tool comprises a pair of complementary cutters which are flexible in, and only in, a direction transverse to the direction of reciprocation to accommodate inaccurately spaced and sized slots. A related object concerns the provision of resilient means urging each of the cutters forming a complementary pair away from one another to insure engagement of the cutters with the respective sides of a slot, and means for limiting the maximum separation possible.

These and other objects of the present invention will become apparent from consideration of the specification taken in conjunction with the accompanying drawings, in which there is shown an exemplary embodiment of the invention, and wherein:

FIGURE 1 is a somewhat diagrammatic side elevational view, partly in section, of a burring machine embodying the principles of the present invention and illustrating the novel broaching tool forming a part thereof;

FIGURE 2 is a vertical sectional view taken along line 2—2 in FIGURE 1;

FIGURE 3 is a horizontal sectional view taken along line 3—3 in FIGURE 1;

FIGURE 4 is a sectional view taken along line 4—4 in FIGURE 1;

FIGURE 5 is a side elevational view of one of the cutters forming a part of the broaching tool;

FIGURE 6 is a front elevational view thereof;

FIGURE 7 is a sectional view taken along line 7—7 in FIGURE 5;

FIGURE 8 is a view looking along line 8—8 in FIGURE 5;

FIGURE 9 is a top plan view of a portion of a hinge member prior to de-burring, illustrating burr thereon which is to be removed; and FIGURE 10 is a similar view thereof illustrating the hinge part after the burrs have been removed.

Generally speaking, the burring machine of the present invention comprises support means for supporting an elongated slotted hinge member in a de-burring position, a plurality of novel broaching tools mounted for reciprocating movement with respect to the supporting means, and motor means for reciprocating the tools to and from the support means through the slots in the hinge member, whereby the burrs thereon will be removed. As will be more apparent hereinafter, each of the broaching tools includes a complementary pair of cutters, one cutter element for de-burring each side of a slot, the separate cutters of each tool being mounted for movement with respect to each other in a direction transverse to the direction of reciprocation, whereby accurate alignment may be facilitated.

Referring to FIGURE 1, the disclosed embodiment of the present invention comprises a main vertical supporting frame 10, at the lower end of which is rigidly fixed a worktable 12 and at the upper end of which is secured a double-acting pneumatic or hydraulic cylinder 14, the inlet and outlet lines of which are indicated at 16 and 18. Cylinder 14 is provided with a conventional piston, the operating end of which extends downwardly from the cylinder as indicated at 20 for reciprocating movement in the vertical direction upon actuation of fluid through lines 16 and 18. A journal member 22 rigidly secured to vertical frame 10 is provided for slidably supporting piston 20.

The lower end of piston 20 is removably received within a collar 24 and maintained therein by any suitable means, such as set screws or the like, whereby disassembly may be facilitated when necessary. Collar 24 is rigidly secured to a U-shaped horizontally extending channel member 26, to the back side of which is rigidly secured an elongated mounting plate 28 extending horizontally the full width of the machine, such width being dictated by the length of the hinge part to be de-burred, as will be more apparent hereinafter. Rigidly secured to the lower end of mounting plate 28, as by means of cap screws 30, are a plurality of horizontally aligned and equally spaced broaching tools, generally designated at 32, each including cutters indicated generally at 34, both of which will be described in greater detail hereinafter.

Rigidly secured to table 12 by means of upright braces 36 is a horizontally extending elongated downwardly and inwardly inclined supporting member 38 having a narrow upwardly projecting flange 40 at the inner edge thereof and a plurality of transverse slots 42.

Referring now to FIGURE 9, there is illustrated a portion of a contiguous hinge member 44 representative of the type of workpiece on which the apparatus of the present invention is designed to operate. Hinge member 44 comprises a plurality of transverse slots 46 through which pass an elongated aperture 48 extending longitudinally of the hinge member. In the course of a manufacture of a hinge part 44 there are unavoidably formed a plurality of burrs 50 around the periphery of aperture 48 wherever it intersects one of the slots 46, as can be clearly seen in FIGURE 9. It is the removal of these burrs to which the present invention is directed. The de-burred hinge member 44 is illustrated in FIGURE 10, wherein it is ready for assembly with another like part by means of an elongated hinge pin to form an elongated hinge of conventional construction. As will be appreciated, it is essential that the burrs 50 be removed to facilitate a proper interfitting of a pair of hinge members to form a hinge, and while such burr removal may appear to the simple, it is in practice a very difficult thing to do because of the inaccessibility of the burrs and the fact that the number of slots is so great. Furthermore, it is important that the burrs be totally removed rather than folded back into the longitudinal aperture 48 such as would interfere with proper assembly.

As will be appreciated, FIGURE 1 is an end elevational view illustrating the basic arrangement of parts, the actual width of the machine (in a direction perpendicular to the plane of the drawings) being governed by the length of the hinge member to be de-burred and/or other practical considerations. In considering the construction of support member 38 in greater detail, reference should be made to FIGURE 2 and 3. As can be seen in FIGURE 1, a hinge member 44 is placed in a de-burring position by sliding it down the upper surface of support member 38 until it abuts flange 40. As shown in FIG- URES 2 and 3, support member 38 is provided with a plurality of slots 42, slightly greater in width than slots 46 in the hinge member, so that the latter is rigidly supported and yet there is clearance down through the slots 46 therein. As will be more apparent hereinafter, it is not essential that the hinge member be accurately positioned longitudinally on the support member, so long as the slots in each of the members are in approximate registry with each other, since the broaching tool will facilitate the necessary alignment automatically. When the hinge member to be de-burred is greater in length than the width of the machine, de-burring of the entire member may be effected by manually indexing it along support member 38 between downward strokes of the broaching tools, so that upon each cycle of reciprocation a fresh group of slots is presented for de-burring.

The details of construction of the novel broaching tool of the present invention are best seen in FIGURES 2 through 7. Referring to FIGURES 2 and 4, each broaching tool 32 comprises a pair of complementary mounting members 54 and 56 spaced slightly apart by means of a spacer 58 and secured together by means of cap screws 60. Just forwardly of the portions of mounting members 54 and 56 which are secured to mounting plate 28 by means of cap screws 30 are vertically extending relatively deep grooves 62 and 64, respectively. As can be seen in FIGURE 4, these grooves form relatively thin web portions 66 and 68 in mounting members 54 and 56, respectively, so that the latter are deflectable with respect to each other and mounting plate 28 in the direction transverse to the direction of reciprocating movement of the broaching tools and mounting members, for purposes as will be more apparent hereinafter. Opposed and aligned counterbores 70 and 72 in mounting members 54 and 56, respectively, are provided for receiving a compression spring 74 adapted to resiliently urge the mounting members away from one other. To limit the divergent displacement of the mounting members caused by compression spring 74 there is provided a countersunk limiting screw 76 having a countersunk nut 78 thereon which may be adjusted to limit the distance apart which the two mounting members may be displaced. In addition to the movement of one mounting member with respect to the other, it should be noted that both mounting members may be moved together transversely with respect to mounting plates 28 by virtue of the thin-section web portions 66 and 68. Adjacent their forward ends, mounting members 54 and 56 are provided with vertically extending inner slots 80 and 82, respectively, adapted to receive and hold cutters 84 and 86 by means of a plurality of machine screws 88. Broaching tools 32 are mounted side by side in horizontal alignment, and one is provided for each slot 46 to be de-burred at one time.

The details of construction of cutters 84 and 86 may be best seen in FIGURES 5 through 8, wherein only cutter 84 is shown since the cutter 86 is identical in all respects, but in reverse. Generally speaking, each cutter comprises an upper shank portion 90, a wedge-shaped cutting portion 92, and a lower pilot portion 94. Shank portion 90 is somewhat raised, as best seen in FIGURE 6, and is provided with a pair of threaded apertures 96 for threadably receiving machine screws 88 to secure the cutters to the mounting members in the manner shown in FIGURE 4. A third smooth-bore aperture 97 may be provided for receiving a dowel pin for alignment purposes, the latter also extending at least partially through apertures 99 in the mounting members. The oblique edge of cutting portion 92 is provided with a raised cutting edge 98 which extends obliquely to the vertical direction of reciprocation of the broaching tool. As will be appreciated, the oblique cutting edges of all of the cutters 84 and 86 lie in the same oblique plane. As can be seen in FIGURES 6 and 7, each cutting portion is undercut at 100 beneath cutting edge 98 to provide for adequate clearance or relief. Pilot portion 94 is provided with a vertically extending raised edge 102 forming a downwardly directed extension of cutting edge 98 and tapering inwardly at its lower end, as at 104, for guide or pilot purposes. Edge 102 and inwardly tapering portion 104 are provided on their forward outer edges with a beveled surface 106, as best seen in FIGURE 8.

Referring to FIGURE 4, it will be noted that each of the cutters is of the same width and thickness as the width and depth, respectively, of the slot in the mounting member in which it is positioned, whereby a tightly interfitting and flush assembly is achieved. The front appearance of the mounting members and associated cutters in an assembled relationship is illustrated in FIGURE 2.

The operation of the apparatus is essentially as follows. In the inoperative position of the apparatus the piston is in a fully raised position, the latter being controlled by suitable control apparatus (not shown) of conventional construction. The de-burring of a hinge member is effected by placing it upon support member 38 in the manner described above when the piston and associated broaching tools are in the raised position, aligning the slots in the hinge member roughly with the slots in the support member. The piston is then energized to begin its downward movement, whereupon a pair of cutters enter each slot in the hinge member. Since the lower ends of the cutters are tapered inwardly, as at 104, and since the hinge member is free to slide longitudinally upon the support member, centering of the slots with the cutters will be automatically effected by the cutters themselves. As can be seen, the cutters are so positioned with respect to the supporting member that when a hinge of a given size is supported thereon the pilot portions of the cutters will be disposed at the bottom of the slots in the hinge member, as shown in FIGURE 3. Upon further downward movement of the broaching tools the obliquely disposed cutting edges 98 first engage the edges of each of the slots adjacent the bottoms thereof, and continued downward movement of the broaching tools causes cutting edges 98 to traverse the full length of each of the edges of each of the slots to cut the burrs therefrom. The control circuit is set so that the piston reaches the bottom of its stroke after the full dimension of the slot has been traversed, but before the mounting members contact the workpiece. The piston and associated broaching tools are then raised to the inactive position preparatory to de-burring another hinge member or another portion of the same hinge member.

Because of the unique construction of the broaching tools of the present invention, perfectly accurate alignment and spacing of the slots in the hinge member is not essential. Since each pair of cutters can be displaced with respect to the other cutters in a transverse direction, account is made for any inaccuracies in the spacing of the slots, the pilot portions of the cutters guiding and directing any transverse movement thereof. The cutters, however, are not movable with respect to each other in a direction parallel to the direction of reciprocation, so that a maximum broaching force can be applied thereto without impairing alignment. In addition, each of the cutters 84 and 86 of a complementary pair are deflectable with respect to each other to account for slightly varying size slots in the hinge members.

It has been found that the speed of reciprocation of the broaching tools is not at all critical, and may be varied to suit any particular application. Furthermore, if desired, the various components of the apparatus may be made adjustable so as to be adapted to receive hinge members of substantially varying sizes and shapes.

Thus, there is disclosed in the above description and in the drawings an exemplary embodiment of the invention which fully and effectively accomplishes the objects thereof. However, it will be apparent that variations in the details of the construction may be indulged in without departing from the sphere of the invention herein described, or the scope of the appended claims.

What is claimed is:

1. A broaching apparatus for removing burrs from the opposite sides of a slot, comprising: a pair of cutters; motor means for reciprocating said cutters into and out of a slot to be-deburred; a cutting edge on each of said cutters extending obliquely to the direction of reciprocation of said cutters, said cutting edges being located in spaced-apart planes each parallel to the sides of the slot to be de-burred; and means for securing each of said cutters to said motor means so that they are rigid with respect to the latter in the direction of reciprocation and flexible with respect to the latter in a transverse direction perpendicular to said spaced-apart planes, whereby when said cutters are reciprocated into a slot said oblique cutting edges cut burrs from the opposite sides thereof.

2. A broaching apparatus for removing burrs from the opposite sides of a slot, comprising: a pair of cutters having inwardly tapering pilot portions at the leading ends thereof; motor means for reciprocating said cutters into and out of a slot to be de-burred; a cutting edge on each of said cutters extending obliquely to the direction of reciprocation of said cutters; means for securing each of said cutters to said motor means so that they are rigid with respect to the latter in the direction of reciprocation and flexible with respect to each other in a transverse direction perpendicular to the sides of the slot to be de-burred; and resilient means urging each of said cutters in a pair away from one another, whereby when said cutters are reciprocated into a slot, guided by said pilot portions, the oblique cutting edges thereon are urged against the sides of the slot to cut burrs therefrom.

3. A broaching apparatus for removing burrs from the opposite sides of a slot, comprising: a pair of cutters having inwardly tapering pilot portions at the leading ends thereof; motor means for reciprocating said cutters into and out of a slot to be de-burred; a cutting edge on each of said cutters extending obliquely to the direction of reciprocation of said cutters; means for securing each of said cutters to said motor means co that they are rigid with respect to the latter in the direction of reciprocation and flexible with respect to each other in a transverse direction perpendicular to the sides of the slot to be de-burred; resilient means urging each of said cutters in pair away from one another; and means limiting the maximum separation of each of said cutters, whereby when said cutters are reciprocated into a slot, guided by said pilot portions, the oblique cutting edges thereon are urged against the sides of the slot to cut burrs therefrom.

4. A broaching apparatus for removing burrs from the opposite sides of a slot, comprising: a pair of cutters; motor means for reciprocating said cutters into and out of a slot to be de-burred; a cutting edge on each of said cutters extending obliquely to the direction of reciprocation of said cutters, said cutting edges being located in spaced-apart planes each parallel to the sides of the slot to be de-burred; means for securing each of said cutters to said motor means so that they are rigid with respect to the latter in the direction of reciprocation and flexible with respect to the latter in a transverse direction perpendicular to said spaced-apart planes; and resilient means urging each of said cutters in a pair away from one another, whereby when said cutters are reciprocated into a slot the oblique cutting edges thereon are urged against the sides of the slot to cut burrs therefrom.

5. A broaching apparatus for removing burrs from the opposite sides of a slot, comprising: a pair of cutters; motor means for reciprocating said cutters into and out of a slot to be de-burred; a cutting edge on each of said cutters extending obliquely to the direction of reciprocation of said cutters, said cutting edges being located in spaced-apart planes each parallel to the sides of the slot to be de-burred; means for securing each of said cutters to said motor means so that they are rigid with respect to the latter in the direction of reciprocation and flexible with respect to the latter in a transverse direction perpendicular to said spaced-apart planes; resilient means urging each of said cutters in a pair away from one another; and means limiting the normal maximum separation of each of said cutters, whereby when said cutters are reciprocated into a slot the oblique cutting edges thereon are urged against the sides of the slot to cut burrs therefrom.

References Cited by the Examiner
UNITED STATES PATENTS

| | | | |
|---|---|---|---|
| 66,763 | 7/67 | Young | 144—88 |
| 495,209 | 4/93 | Seymour | 144—67 |
| 869,998 | 11/07 | Trask | 29—11 |
| 1,556,675 | 10/25 | Carter | 90—82 |
| 2,508,183 | 5/50 | Mitchell | 29—95 |

WILLIAM W. DYER, JR., Primary Examiner.

J. SPENCER OVERHOLSER, Examiner.